United States Patent
Kwon et al.

(10) Patent No.: US 7,527,406 B2
(45) Date of Patent: May 5, 2009

(54) BACKLIGHT ASSEMBLY AND LIQUID CRYSTAL DISPLAY DEVICE WITH REDUCED NOISE

(75) Inventors: Yoon-Soo Kwon, Seoul (KR); Jung-Tae Kang, Suwon-si (KR); Sang-Hoon Park, Yongin-si (KR); Jin-Ho Ha, Suwon-si (KR); Woong-Jae Chang, Suwon-si (KR)

(73) Assignee: Samsung Electronics, Co., Ltd., Gyeonggi-do (KR)

( * ) Notice: Subject to any disclaimer, the term of this patent is extended or adjusted under 35 U.S.C. 154(b) by 138 days.

(21) Appl. No.: 11/403,398

(22) Filed: Apr. 12, 2006

(65) Prior Publication Data

US 2006/0286831 A1    Dec. 21, 2006

(30) Foreign Application Priority Data

Jun. 15, 2005    (KR) .................... 10-2005-0051532

(51) Int. Cl.
*F21V 7/04*    (2006.01)

(52) U.S. Cl. .................. 362/561; 362/26; 362/27; 362/600; 362/606; 362/632

(58) Field of Classification Search ............... 362/561, 362/26, 27, 600, 603, 606, 607, 609, 614, 362/632–634; 315/160, 161, 291
See application file for complete search history.

(56) References Cited

U.S. PATENT DOCUMENTS

| | | | |
|---|---|---|---|
| 5,595,505 A * | 1/1997 | Duke et al. ................. 439/630 |
| 6,843,584 B2 * | 1/2005 | Bang et al. ................. 362/249 |
| 6,939,020 B2 * | 9/2005 | Lim ............................ 362/97 |
| 7,093,971 B2 * | 8/2006 | Yu et al. ..................... 362/633 |
| 7,157,861 B2 * | 1/2007 | Chou et al. ............ 315/209 PZ |
| 2001/0035923 A1 * | 11/2001 | Cha et al. ..................... 349/65 |
| 2005/0127848 A1 * | 6/2005 | Park et al. ............... 315/209 R |
| 2006/0120109 A1 * | 6/2006 | Inoue et al. ................. 362/614 |

FOREIGN PATENT DOCUMENTS

JP    2000269677    *    9/2000

* cited by examiner

*Primary Examiner*—Sandra L O'Shea
*Assistant Examiner*—Mark Tsidulko
(74) *Attorney, Agent, or Firm*—Haynes and Boone, LLP

(57) ABSTRACT

A backlight assembly includes a receiving container, a first side mold, a printed circuit board and a plurality of lamps. The first side mold is on the side of the receiving container. The printed circuit board is combined with the first side mold, the printed circuit board including a plurality of conductive clips and a power supply line assembly for transmitting a lamp driving electric power. The lamps are combined with the conductive clips to generate light based on the lamp driving electric power. The power supply line assembly includes a first conductive line electrically connected to a subgroup of conductive clips and a second conductive line electrically connected to the other conductive clips. The first and second conductive lines are supplied with the lamp driving electric powers that have reverse phases to each other. Therefore, noise is decreased according to its waterfall curve to improve an image display quality.

18 Claims, 7 Drawing Sheets

BACKLIGHT ASSEMBLY AND LIQUID CRYSTAL DISPLAY DEVICE WITH REDUCED NOISE

CROSS REFERENCE OF RELATED APPLICATION

This application claims priority from Korean Patent Application No. 2005-51532 filed on Jun. 15, 2005, the disclosure of which is hereby incorporated herein by reference in its entirety.

BACKGROUND OF THE INVENTION

1. Field of the Invention

The present invention relates to a backlight assembly and a liquid crystal display (LCD) device having the backlight assembly. More particularly, the present invention relates to a backlight assembly capable of reverse phase driving to improve an image display quality and an LCD device having the backlight assembly.

2. Description of the Related Art

A liquid crystal display (LCD) device, in general, displays an image using liquid crystals that have an optical characteristic such as anisotropy of refractivity and an electrical characteristic such as anisotropy of dielectric constant. The LCD device has advantageous characteristics such as thinness, lower driving voltage, lower power consumption, etc., than other types of display devices such as cathode ray tube (CRT) device, plasma display panel (PDP) device, etc. Therefore, the LCD device is used widely in various display fields.

The LCD device includes a thin film transistor (TFT) substrate, a color filter substrate and a liquid crystal layer. The color filter substrate corresponds to the TFT substrate. The liquid crystal layer is interposed between the TFT substrate and the color filter substrate. The LCD device being a non-emissive type display device, it requires a backlight assembly to supply an LCD panel of the LCD device with light.

When the size of an LCD device is increased, the size of its backlight assembly is also increased. Thus, a large screen LCD device having a direct illumination type backlight assembly includes a plurality of lamps that are on a rear surface of the LCD panel. Often, these lamps are arranged so that they are substantially parallel to each other, to directly shine light onto the LCD panel.

The number of lamps in the direct illumination type backlight assembly is increased. When the direct illumination type backlight assembly includes external electrode fluorescent lamps (EEFL) that are connected in parallel to each other, the manufacturing cost is decreased and the driving of the lamps is stabilized.

In a conventional direct illumination type backlight assembly, end portions of the EEFLs are electrically connected to a conductive fixing member so that lamp driving electric powers that are applied to the EEFLs have a same phase with respect to each other.

When the driving voltages having the same phase are applied to adjacent EEFLs, an electromagnetic interference is formed between the adjacent EEFLs so that noise of a waterfall curve is generated between the adjacent EEFLs to deteriorate an image display quality of the LCD device.

SUMMARY OF THE INVENTION

The present invention provides a backlight assembly capable of reverse phase driving to improve an image display quality.

The present invention also provides an LCD device having the above-mentioned backlight assembly.

A backlight assembly in accordance with one aspect of the present invention includes a receiving container, a first side mold, a printed circuit board and a plurality of lamps. The first side mold is on a side of the receiving container. The printed circuit board is combined with the first side mold, the printed circuit board including a plurality of conductive clips and a power supply line assembly for transmitting a lamp driving electric power. The lamps are combined with the conductive clips to generate light upon receiving the lamp driving electric power.

The power supply line assembly may include a first conductive line electrically connected to a subgroup of the conductive clips, and a second conductive line electrically connected to the conductive clips that are not connected to the first conductive line. The lamp driving electric power that is applied to the first and second conductive lines may have reverse phases to each other.

The backlight assembly may further include a second side mold combined with the first side mold to cover the printed circuit board and external electrodes. The second side mold may further include a plurality of insulating partition walls that extend toward the printed circuit board between the conductive clips.

A backlight assembly in accordance with another aspect of the present invention includes a receiving container, a printed circuit board and a plurality of lamps. The printed circuit board is received in the receiving container, and includes a plurality of conductive clips and a power supply line assembly for transmitting a lamp driving electric power. The power supply line assembly includes a first conductive line and a second conductive line. The first conductive line is electrically connected to a subgroup of the conductive clips. The second conductive line is electrically connected to the conductive clips that are not connected to the first conductive line. The lamps are combined with the conductive clips to generate light upon receiving the lamp driving electric power.

A liquid crystal display device in accordance with one embodiment of the present invention includes a backlight assembly and a display unit. The backlight assembly includes a receiving container, a first side mold, a printed circuit board and a plurality of lamps. The first side mold is on a side of the receiving container. The printed circuit board is combined with the first side mold, the printed circuit board including a plurality of conductive clips and a power supply line assembly for transmitting a lamp driving electric power. The lamps are combined with the conductive clips to generate light upon receiving the lamp driving electric power. The display unit displays an image based on the light generated from the backlight assembly.

According to the present invention, the lamp driving electric power is applied to the external electrode fluorescent lamps in the reverse phase driving method so that a noise level is decreased according to its waterfall curve, improving an image display quality of the LCD device.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE EMBODIMENTS

Figure 1:
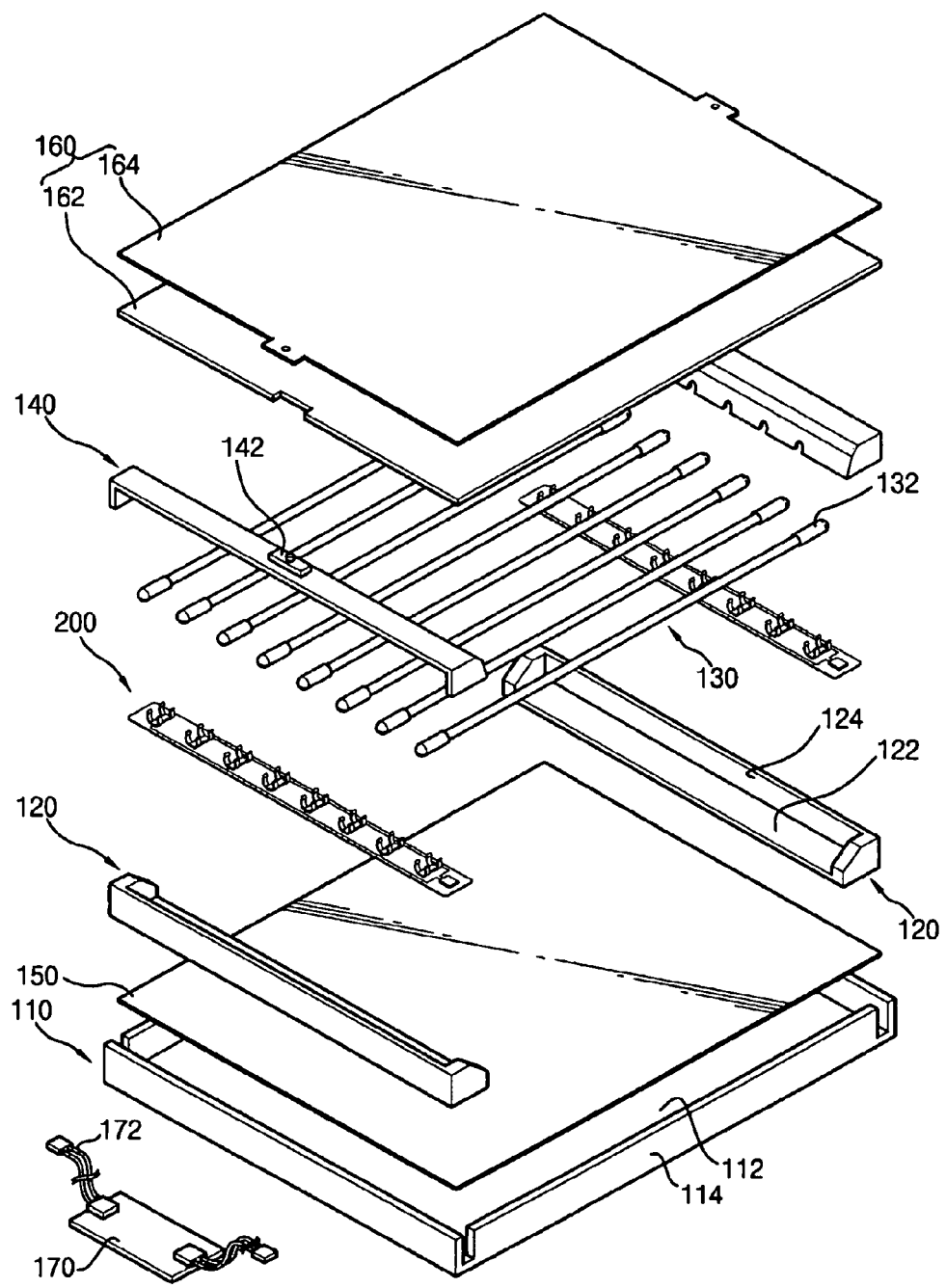
FIG. 1 is an exploded perspective view showing a backlight assembly in accordance with one embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
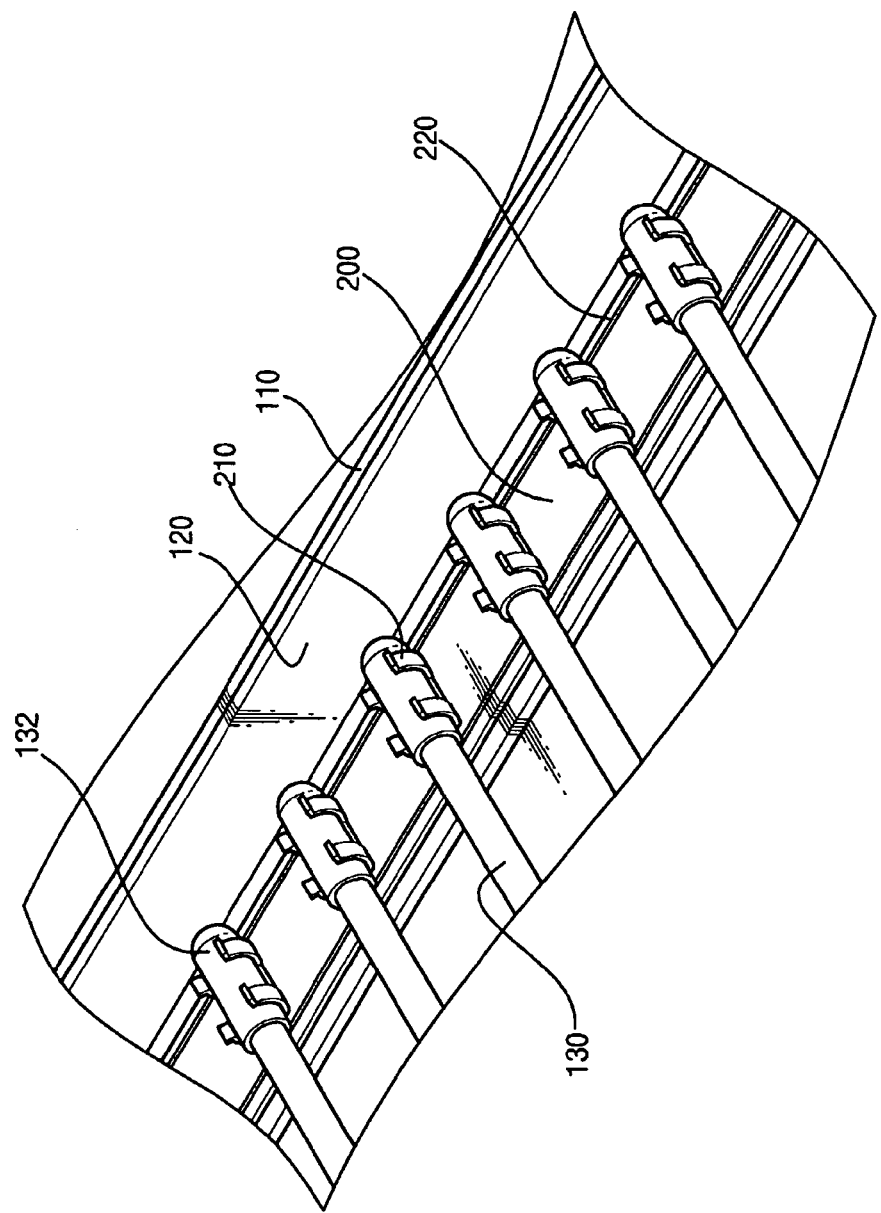
FIG. 2 is a perspective view showing a backlight assembly shown in FIG. 1.

FIG. 1 is an exploded perspective view showing a backlight assembly in accordance with one embodiment of the present invention. FIG. 2 is a perspective view showing a backlight assembly shown in FIG. 1.

Referring to FIGS. 1 and 2, the backlight assembly 100 includes a receiving container 110, a first side mold 120, a printed circuit board (PCB) 200 and a plurality of lamps 130.

The receiving container 110 includes a bottom portion 112 and a side portion 114. The side portion 114 extends from the edges of the bottom portion 112 to form a receiving space. The receiving container 110 may have strong metal that may not be deformed.

A first side mold 120 is in the receiving container 110 on a side of the receiving container 110, and becomes assembled with the end portions of the lamps 130. In FIGS. 1 and 2, two first side molds 120 are positioned along the two sides of the receiving container 110 that become coupled with the end portions of the lamps 130. Each of the first side molds 120 includes a combining portion 122 and a sidewall 124. The combining portion 122 is combined with the PCB 200. The sidewall 124 protrudes from a side of the combining portion 122 in a direction that is substantially perpendicular to a surface of the combining portion 122. The combining portion 122 is parallel to the bottom portion 112 of the receiving container 110 upon assembly. The sidewall 124 is parallel to the side portion 114 of the receiving container 110. The first side mold 120 includes an insulating material so that the receiving container 110 that has the metal is electrically insulated from the PCB 200.

The PCB 200 is fixed to the first side mold 120 on the sides of the receiving container 110. The PCB 200 includes a plurality of conductive clips 210 and a power supply line assembly 220. The lamps 130 are electrically connected to the PCB 200 through the conductive clips 210. The power supply line assembly 220 transmits a lamp driving electric power to the lamps 130.

The power supply line assembly 220 is electrically connected to the conductive clips 210 to transmit the lamp driving electric power that is from an inverter 170 to the conductive clips 210. The conductive clips 210 include a metal to transmit the lamp driving electric power that is from the power supply line assembly 220 to the lamps 130.

The PCB 200 is fixed to the first side mold 120 through a screw. Alternatively, the PCB 200 may be fixed to the first side mold 120 through an adhesive member such as an adhesive tape.

The lamps 130 are combined with the conductive clips 210 of the PCB 200, and the lamps 130 are substantially parallel to each other. The lamps 130 are external electrode fluorescent lamps (EEFL) that have external electrodes 132 on outer surfaces corresponding to end portions to which the conductive clips 210 are fixed. The external electrode fluorescent lamps 132 generate light upon receiving the lamp driving electric power that is generated from the inverter 170 and applied to the external electrodes 132 through the power supply line assembly 220 and the conductive clips 210.

Figure 3:
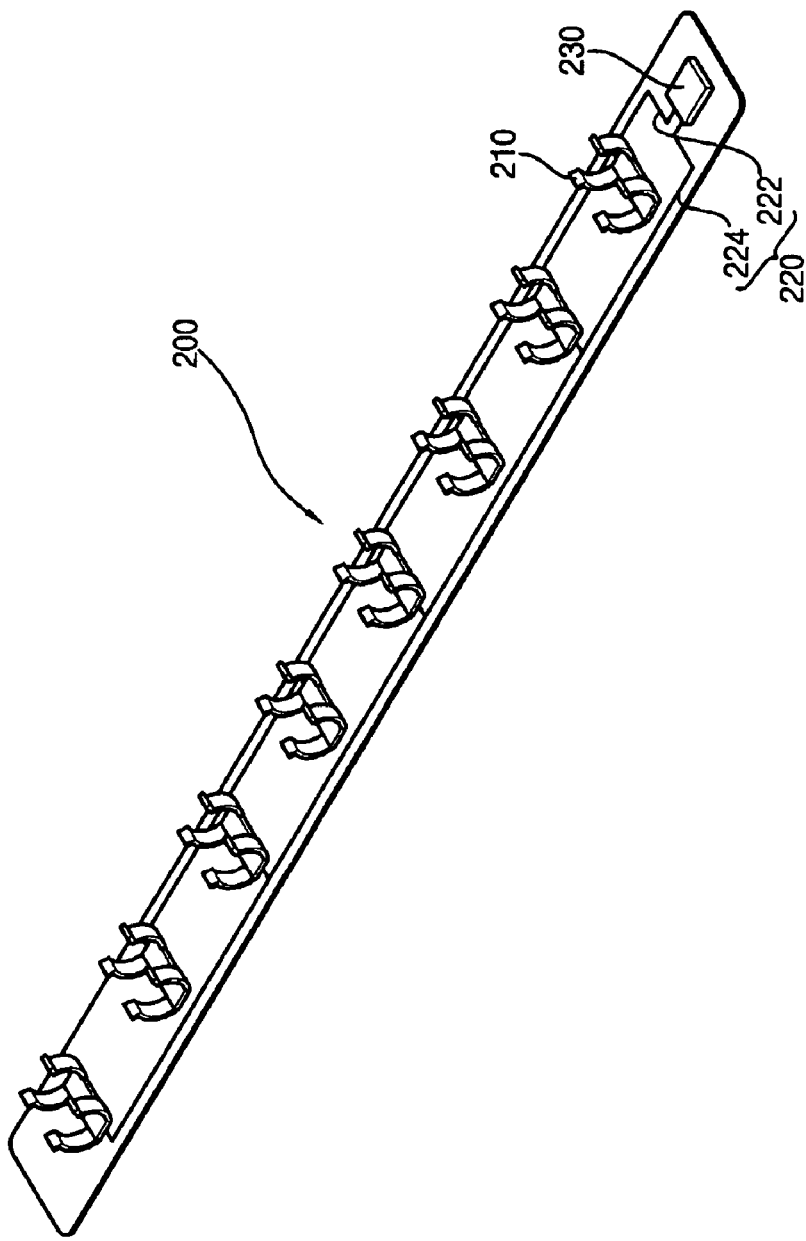
FIG. 3 is a perspective view showing a printed circuit board (PCB) shown in FIG. 1.
Figure 4:
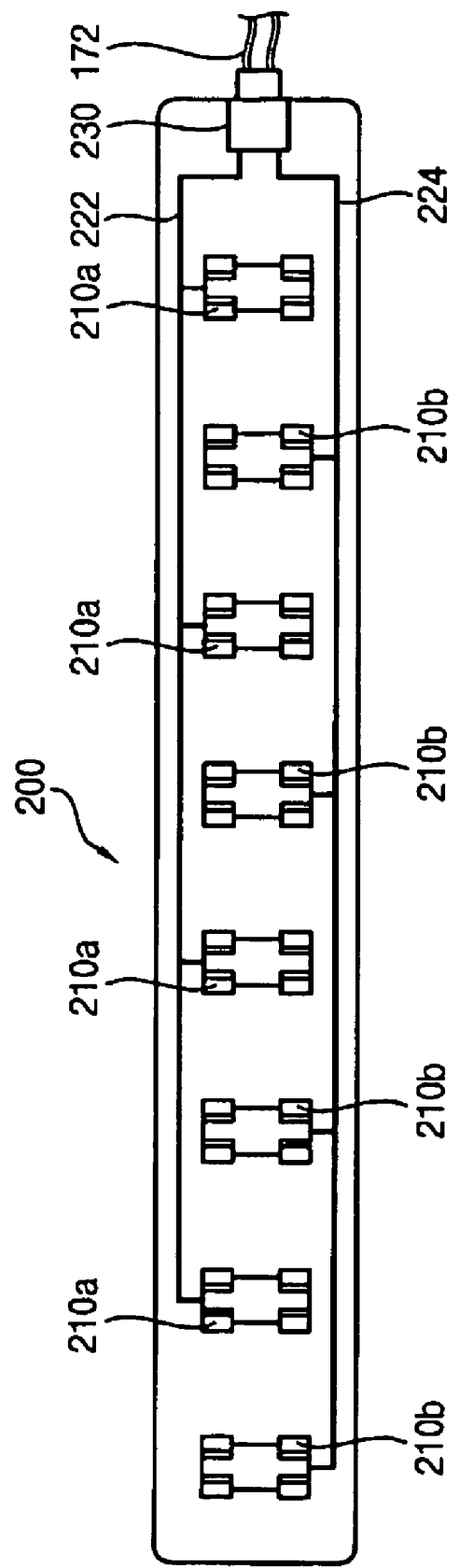
FIG. 4 is a plan view showing the PCB shown in FIG. 3.

FIG. 3 is a perspective view showing a printed circuit board (PCB) shown in FIG. 1. FIG. 4 is a plan view showing the PCB shown in FIG. 3.

Referring to FIGS. 1 to 4, the PCB includes the conductive clips 210 and the power supply line assembly 220.

The conductive clips 210 include a metal to apply the lamp driving electric power to the external electrodes 132 of the lamps 130 through the power supply line assembly 220.

The conductive clips 210 protrude from an upper surface of the PCB 200 to form openings. The lamps 130 are inserted into the openings of the conductive clips 210.

The conductive clips 210 may be spaced apart by a constant distance on the PCB 200 so that the lamps 130 are spaced apart by the constant distance. Alternatively, the conductive clips 210 may be spaced apart by varying distances so that the lamps 130 are spaced apart by varying distances.

The conductive clips 210 are soldered to the PCB 200. Alternatively, the conductive clips 210 may be integrally formed on the PCB. The conductive clips 210 may also be attached to the PCB 200 through a conductive adhesive.

A metal layer is patterned on the PCB 200 to form the power supply line assembly 220. The power supply line assembly 220 is electrically connected to the conductive clips 210 to transmit the lamp driving electric power from the inverter 170 to the conductive clips 210.

The power supply line assembly 220 includes a first conductive line 222 and a second conductive line 224. Every other conductive clips 210a are electrically connected to the first conductive line 222. The other conductive clips 210b are electrically connected to the second conductive line 224.

In reverse phase driving the lamps 130, the first and second conductive lines 222 and 224 are supplied with the lamp driving electric powers. The power supplied to the first conductive line has a reverse phase relative to the power supplied to the second conductive line.

Particularly, the lamp driving electric power that is from the inverter 170 includes a first alternating current and a second alternating current, both of which have a substantially same frequency. The first alternating current has the reverse phase to the second alternating current. The first alternating current is applied to every other conductive clips 210a through the first conductive line 222. The second alternating current is applied to the conductive clips 210b through the second conductive line 224. Therefore, the first alternating current is applied to a portion of the lamps 130 that are electrically connected to the odd numbered conductive clips 210a, and the second alternating current is applied to a remaining portion of the lamps 130 that are electrically connected to the even numbered conductive clips 210b.

The first and second alternating currents that have the reverse phases to each other are applied to the adjacent lamps 130 to decrease noise according to a waterfall curve. Depending on the embodiment, the power supply line assembly 220 may be connected to the conductive clips 210 in any suitable way.

The PCB 200 may further include a connector 230 that is electrically connected between the PCB 200 and a transmitting line 172 to transmit the lamp driving electric power to the PCB 200. The transmitting line 172 is electrically connected to the first and second conductive lines 222 and 224 through the connector 230. When the transmitting line 172 is electrically connected to the first and second conductive lines 222 and 224 through the connector 230, a solder process for electrically connecting the transmitting line 172 to the first and second conductive lines 222 and 224 may be omitted, thereby simplifying a manufacturing process of the backlight assembly 100.

An insulating layer may be formed on the PCB 200 to protect the power supply line assembly 220.

Referring again to FIG. 1, the backlight assembly 100 may further include a second side mold 140 that is combined with the first side mold 120 to cover the PCB 200.

The second side mold 140 blocks the external electrodes 132 that do not generate light, thereby decreasing a shadow area and increasing the luminance uniformity. The second side mold 140 supports the optical member 160 that is on the second side mold 140 to guide the optical member 160. The second side mold 140 may have a guide portion 142 to guide the optical member 160.

Figure 5:
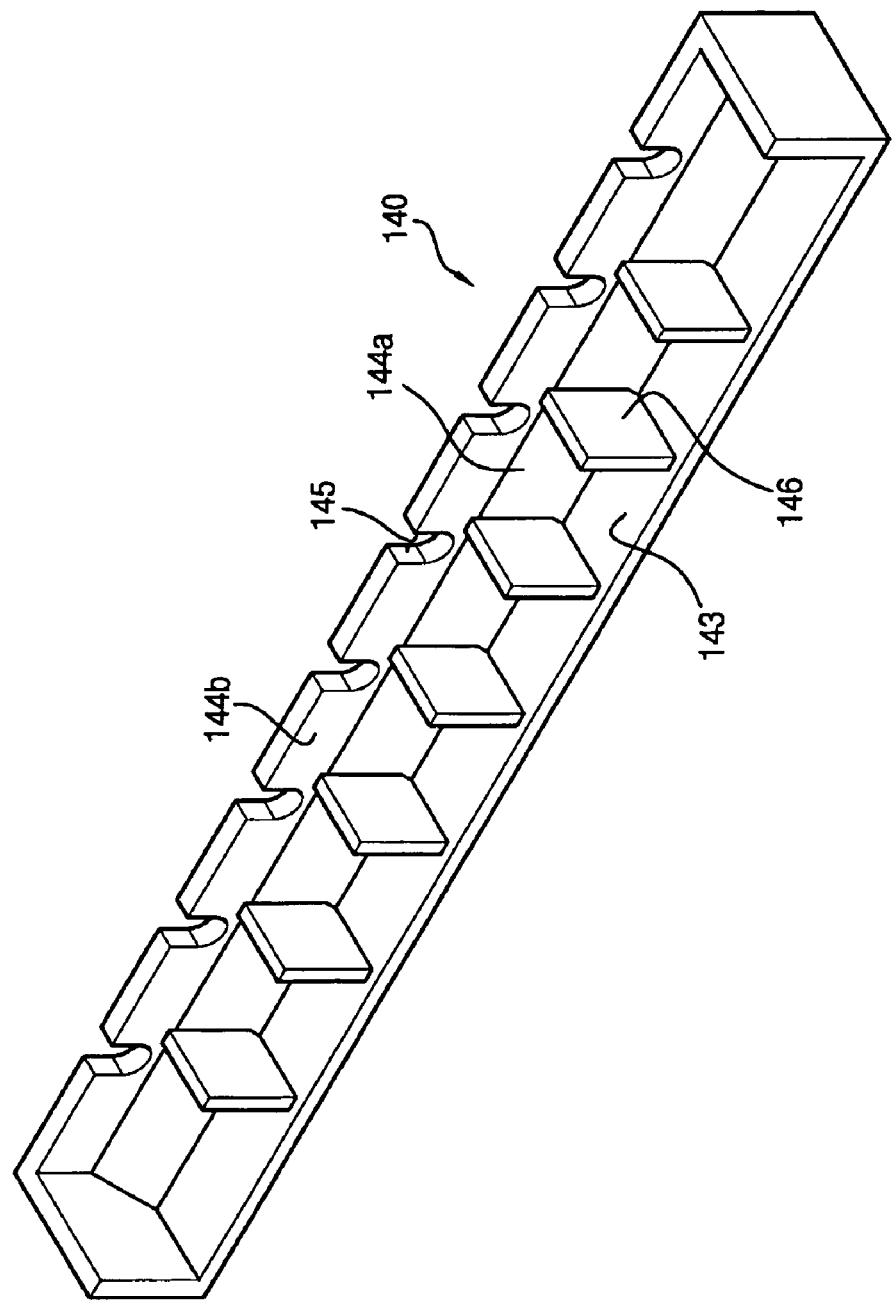
FIG. 5 is a perspective view showing a rear surface of a second side mold shown in FIG. 1.

FIG. 5 is a perspective view showing a rear surface of a second side mold shown in FIG. 1.

Referring to FIGS. 1 and 5, the second side mold 140 includes an upper surface 143 and an inclined surface 144. The upper surface 143 of the second side mold 140 is substantially in parallel with the bottom portion 112 of the receiving container 110. The inclined surface 144 is inclined with respect to the upper surface 143 by a predetermined angle. A plurality of cutouts 145 are formed on the inclined surface 144, spaced apart to fit with the lamps 130.

Referring to FIGS. 1 to 5, the second side mold 140 includes an upper surface 143, a first inclined surface 144a and a second inclined surface 144b. The upper surface 143 is substantially parallel to the bottom portion 112 of the receiving container 110. The first inclined surface 144a is inclined with respect to the upper surface 143 by a predetermined angle. The second inclined surface 144b extends from the first inclined surface 144a in a direction perpendicular to the bottom portion 112. A plurality of cutouts 145 are formed on the second inclined surface 144b, spaced apart to fit with the lamps 130.

The second side mold 140 may further include a plurality of insulating partition walls 146 between the conductive clips 210 so that the conductive clips 210 are spaced apart from each other to decrease an electromagnetic interference between adjacent conductive clips 210.

The second side mold 140 may further include a plurality of insulating partition walls 146 that are extruded from the upper surface 143 toward the PCB 200. Upon assembly, the insulating partition walls 146 are disposed between neighboring conductive clips 210 of the PCB 200 so that the conductive clips 210 are partitioned from each other. This way, the insulating partition wall 146 ensures a sufficient insulating gap between the conductive clips 210, preventing or reducing a signal distortion that may be caused by a different phase between a first alternating current and a second alternating current. The signal distortion includes an electromagnetic interference between adjacent conductive clips 210. The first and second alternating currents are generated from the inverter 170.

Figure 6:
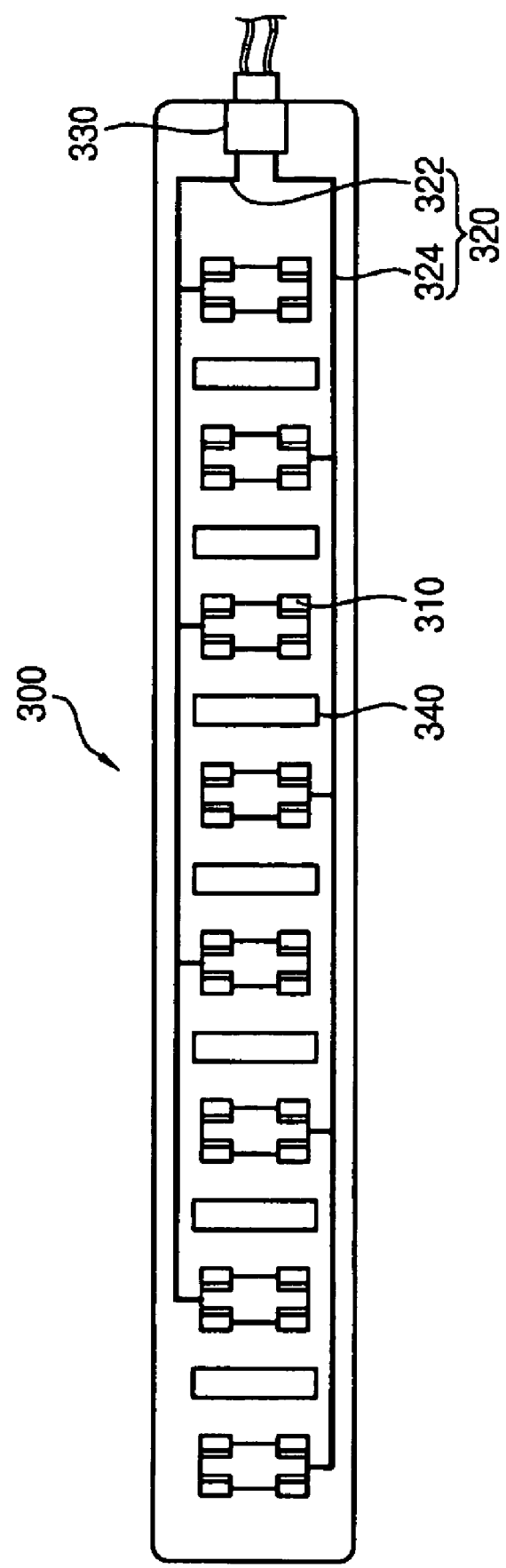
FIG. 6 is a plan view showing a PCB in accordance with another embodiment of the present invention.

FIG. 6 is a plan view showing a PCB in accordance with another embodiment of the present invention.

Referring to FIGS. 5 and 6, the PCB 300 includes a plurality of conductive clips 310, a power supply line assembly 320 and a connector 330. The power supply line assembly 320 includes a first conductive line 322 and a second conductive line 324.

The conductive clips 310, the power supply line assembly 320 and the connector 330 of FIG. 6 are same as in FIG. 4. Thus, any repetitious explanations will be omitted.

A plurality of holes 340 is formed on the PCB 300 between the conductive clips 310. The holes 340 correspond to insulating partition walls 146 of a second side mold 140. When the second side mold 140 is combined with the PCB 300, the insulating partition walls 146 are inserted into the holes 340 of the PCB 300.

When the insulating partition walls 146 are inserted into the holes 340, the insulating partition walls 146 prevents the adjacent conductive clips 310 from being electrically shorted, so that reliability of electrical insulation between the adjacent conductive clips 310 may be enhanced.

Referring again to FIG. 1, the backlight assembly 100 may further include a reflecting plate 150, an optical member 160, and an inverter 170. The reflecting plate 150 is under the lamps 130. The optical member 160 is on the lamps 130. The inverter 170 generates a lamp driving electric power.

The reflecting plate 150 is on a bottom portion 112 of the receiving container 110, and light generated from the lamps 130 is reflected from the reflecting plate 150 toward a front side of the backlight assembly 100. The reflecting plate 150 includes a highly reflective material. Examples of the highly reflective material that can be used for the reflecting plate 150 include polyethyleneterephthalate (PET) and polycarbonate (PC). Alternatively, the receiving container 110 may include a highly reflective material so that the reflecting plate 150 may be omitted.

The optical member 160 is on the lamps 130 to improve optical characteristics of the light generated from the lamps 130. The optical member 160 includes a diffusion plate 162 and optical sheets 164. The diffusion plate 162 diffuses the light generated from the lamps 130. The optical sheets 164 increase a luminance of the light that has passed through the diffusion plate 162.

The diffusion plate 162 diffuses the light that is generated from the lamps 130 to increase the luminance uniformity. The diffusion plate 160 has a substantially quadrangular plate shape of a predetermined thickness. The diffusion plate 160 is supported by the second side mold 140 so that the diffusion plate 160 is spaced apart from the lamps 130 by a predetermined distance. For example, the diffusion plate 162 includes polymethylmethacrylate (PMMA) and a diffusing agent.

The optical sheets 164 are on the diffusion plate 162. The optical sheets 164 guide the light that is diffused by the diffusion plate 162 to increase the luminance of the light that has passed through the diffusion plate 162. The optical sheets 164 may include a prism sheet that increases a luminance when viewed on a plane. The optical sheets 164 may include a diffusion sheet that increases the luminance uniformity. The optical sheets 164 may further include a reflective polarizing sheet that transmits a portion of the light and reflects a remaining portion of the light to recycle the light to improve the luminance. Alternatively, the backlight assembly 100 may further include additional optical sheets or one of the optical sheets 164 may be omitted to achieve the desired level of luminance.

The inverter 170 is on a rear surface of the receiving container 110 to generate the lamp driving electric power to drive the lamps 130. The inverter 170 elevates a level of an externally provided voltage to apply the lamp driving electric power that is an alternating current to the lamps 130.

In FIG. 4, the lamp driving electric power that is generated from the inverter 170 is applied to the PCB through the transmitting line 172 and the connector 230. The lamp driving electric power generated from the inverter 170 includes a first alternating current and a second alternating current. The second alternating current is of substantially the same magnitude as the first alternating current but reverse in phase.

In a reverse phase driving of the lamps 130, the first alternating current is applied to every other conductive clips 210a through the first conductive line 222, and the second alternating current is applied to the conductive clips 210b through the second conductive line 224 so that the first and the second alternating currents are applied in an alternating manner to the conductive clips 210.

Figure 7:
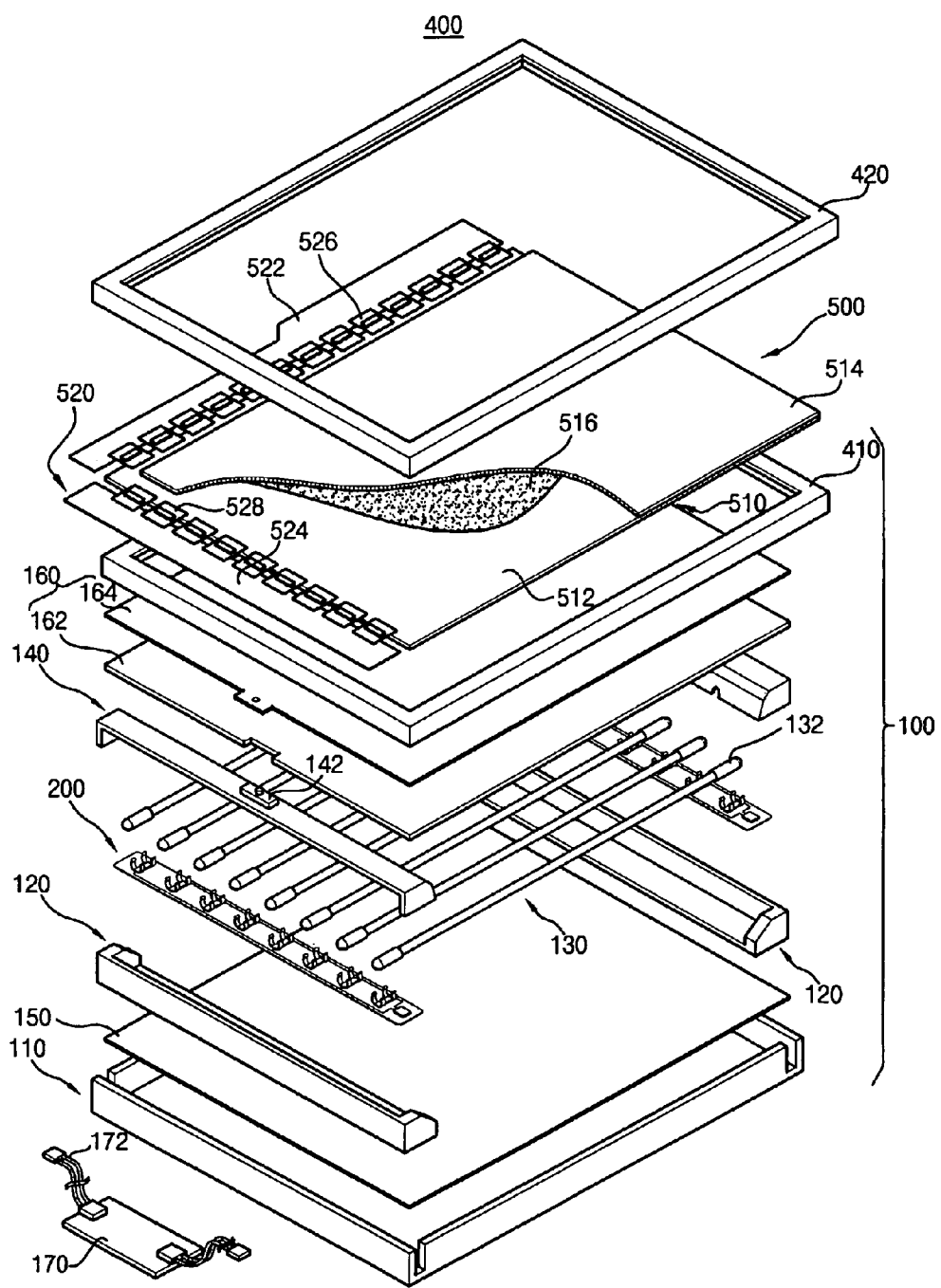
FIG. 7 is an exploded perspective view showing an LCD device in accordance with one embodiment of the present invention.

FIG. 7 is an exploded perspective view showing an LCD device in accordance with one embodiment of the present invention.

Referring to FIG. 7, the LCD device 400 includes a backlight assembly 100 and a display unit 500. The backlight assembly 100 generates light. The display unit 500 displays an image based on the light generated from the backlight assembly 100.

The display apparatus of FIGS. 1 to 6 are the same as in FIG. 7 except a middle mold 410. Thus, the same reference numerals will be used to refer to the same or like parts as those described in FIGS. 1 to 6 and any further explanations concerning the above elements will be omitted.

The middle mold 410 is combined with a receiving container 110 to fix an optical member 160 to the receiving container 110. The middle mold 410 fixes a peripheral portion of an optical member 160 to the receiving container 110, and is combined with a side portion 114 of the receiving container 110. The middle mold 410 guides the LCD panel 510 to its proper position. When a size of the middle mold 410 is increased, the middle mold 410 may be made up of multiple (e.g., two or four) segments that can be combined to form the middle mold.

The display unit 500 includes an LCD panel 510 and a driving circuit part 520. The LCD panel 510 is on the backlight assembly 100 to display the image. The driving circuit part 520 generates a control signal to drive the LCD panel 510.

The LCD panel 510 includes a first substrate 512, a second substrate 514 and a liquid crystal layer 516. The second substrate 514 is approximately parallel to the first substrate 512. The liquid crystal layer 516 is interposed between the first and second substrates 512 and 514.

The first substrate 512 includes a plurality of thin film transistors (TFT) that are arranged in a matrix configuration. For example, the first substrate 512 includes a transparent glass. A source electrode (not shown), a gate electrode (not shown) and a drain electrode (not shown) of each of the TFT are electrically connected to a data line, a gate line and a pixel electrode (not shown), respectively. The pixel electrode (not shown) includes a transparent conductive material.

The second substrate 514 is a color filter substrate that includes a red pixel, a green pixel and a blue pixel that display red light, green light and blue light, respectively. The second substrate 514 further includes a common electrode (not shown) that has a transparent conductive material.

When a driving voltage is applied to the gate electrode of each of the TFT so that the TFT is turned on, an electric field is formed between the pixel electrode (not shown) and the common electrode (not shown). The arrangement of the liquid crystal layer 516 between the first and second substrates 512 and 514 is changed by the electric field applied to the liquid crystal layer 516 so that a light transmittance of the liquid crystal layer 516 is changed. By changing the light transmittance, a desired image having a predetermined gray-scale is produced.

The driving circuit part 520 includes a data printed circuit board (PCB) 522, a gate PCB 524, a data driving circuit film 526 and a gate driving circuit film 528. The data PCB 522 applies a data driving signal to the LCD panel 510. The gate PCB 524 applies a gate driving signal to the LCD panel 510. The data PCB 522 is electrically connected to the LCD panel 510 through a data driving circuit film 526. The gate PCB 524 is electrically connected to the LCD panel 510 through a gate driving circuit film 528. Each of the data driving circuit film 526 and the gate driving circuit film 528 includes a tape carrier package (TCP) or a chip on film (COF). Alternatively, an additional line is formed on the LCD panel 510 and the gate driving circuit film 528 so that the gate PCB 524 may be omitted.

The LCD device 400 may further include a top chassis 420 to fix the display unit 500 to the backlight assembly 100. The top chassis 420 is combined with the receiving container 110 to fix the LCD panel 510 to the backlight assembly 100. The data driving circuit film 526 is bent toward a rear surface of the receiving container 110 so that the data PCB 522 is on a side surface or the rear surface of the receiving container 110. The top chassis 420 may include a strong metal that may not be deformed.

According to the present invention, the PCB includes the conductive clips combined with the external electrode fluorescent lamps and the power supply line assembly for transmitting the lamp driving electric power so that the lamp driving electric power is applied to the external electrode fluorescent lamps in the reverse phase driving method.

In addition, noise is decreased according to the waterfall curve, indicating an improvement in the image display quality of the LCD device.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A backlight assembly comprising:
a receiving container;
a first side mold on a side of the receiving container;
a printed circuit board combined with the first side mold, the printed circuit board including a plurality of conductive clips and a power supply line assembly for supplying lamp driving electric power; and
a plurality of lamps combined with the conductive clips to generate light upon receiving the lamp driving electric power;
wherein the power supply line assembly comprises:
a first conductive line electrically connected to a first subgroup of the conductive clips; and
a second conductive line electrically connected to a second subgroup of the conductive clips that are not connected to the first conductive line, wherein the first and second conductive lines are supplied with the lamp driving electric powers that have reverse phases to each other and the conductive clips of the first and second subgroups alternate with each other.

2. The backlight assembly of claim 1, wherein the conductive clips protrude from the printed circuit board so that the lamps are combined with the conductive clips.

3. The backlight assembly of claim 2, wherein the conductive clips are soldered on the printed circuit board.

4. The backlight assembly of claim 2, wherein the conductive clips are spaced apart from each other by a constant distance.

5. The backlight assembly of claim 1, wherein the lamps comprise external electrode fluorescent lamps (EEFL) that have external electrodes on outer surfaces corresponding to end portions to which the conductive clips are fixed.

6. The backlight assembly of claim 1, further comprising a second side mold combined with the first side mold to cover the printed circuit board and the external electrodes.

7. The backlight assembly of claim 6, wherein the second side mold further comprises a plurality of insulating partition walls that extend toward the printed circuit board between the conductive clips.

8. The backlight assembly of claim 7, wherein a plurality of holes for receiving the insulating partition walls are formed on the printed circuit board.

9. The backlight assembly of claim 1, further comprising:
a reflecting plate under the lamps;
an optical member on the lamps; and
an inverter that generates the lamp driving electric power coupled to the power supply line assembly.

10. The backlight assembly of claim 9, wherein the printed circuit board further comprises a connector electrically connected to a transmitting line that is connected to the inverter.

11. The backlight assembly of claim 9, wherein the optical member comprises:
a diffusion plate that diffuses the light; and
at least one optical sheet on the diffusion plate to increase luminance of the light.

12. A backlight assembly comprising:
a receiving container:
a printed circuit board received in the receiving container, the printed circuit board including a plurality of conductive clips and a power supply line assembly for transmitting a lamp driving electric power, the power supply line including:
a first conductive line electrically connected to a first subgroup of the conductive clips; and
a second conductive line electrically connected to a second subgroup of the conductive clips that are not connected to the first conductive line; and
a plurality of lamps combined with the conductive clips to generate light upon receiving the lamp driving electric power, wherein the first and second conductive lines are supplied with the lamp driving electric powers that have reverse phases to each other and the conductive clips of the first and second subgroups alternate with each other.

13. The backlight assembly of claim 12, wherein the lamps comprise external electrode fluorescent lamps (EEFL) that have external electrodes on outer surfaces corresponding to end portions to which the conductive clips are fixed.

14. A liquid crystal display device comprising:

a backlight assembly including:

a receiving container;

a first side mold on a side of the receiving container;

a printed circuit board combined with the first side mold, the printed circuit board including a plurality of conductive clips and a power supply line assembly for transmitting a lamp driving electric power; and a plurality of lamps combined with the conductive clips to generate light upon receiving the lamp driving electric power; and a display unit that displays an image based on the light generated from the backlight assembly wherein the power supply line assembly comprises:

a first conductive line electrically connected to a first subgroup of the conductive clips; and a second conductive line electrically connected to a second subgroup of the conductive clips that are not connected to the first conductive line, wherein the first and second conductive lines are supplied with the lamp driving electric powers that have reverse phases to each other and the conductive clips of the first and second subgroups alternate with each other.

15. The liquid crystal display device of claim 14, wherein the lamps comprise external electrode fluorescent lamps (EEFL) that have external electrodes on outer surfaces corresponding to end portions to which the conductive clips are fixed.

16. The liquid crystal display device of claim 15, wherein the backlight assembly further comprises a second side mold combined with the first side mold to cover the printed circuit board.

17. The liquid crystal display device of claim 16, wherein the second side mold further comprises: a plurality of insulating partition walls positioned to extend between the conductive clips and are protrude toward the printed circuit board, and a plurality of holes for receiving the insulating partition walls formed on the printed circuit board.

18. The liquid crystal display device of claim 14, wherein the display unit comprises: a liquid crystal display panel on the backlight assembly to display the image; and a driving circuit part that generates a control signal for driving the liquid crystal display panel.

* * * * *